United States Patent [19]

Lefevre et al.

[11] Patent Number: 4,871,254
[45] Date of Patent: Oct. 3, 1989

[54] METHOD AND DEVICE FOR DETECTING PROPAGATION TIME VARIATIONS IN A RING INTERFEROMETER AND APPLICATION THEREOF TO WAVE LENGTH CONTROL

[75] Inventors: Hervé Lefevre, Paris; Didier Rolly, Marcoussis, both of France

[73] Assignee: Thomson-CSF, Paris, France

[21] Appl. No.: 173,548

[22] Filed: Mar. 25, 1988

[30] Foreign Application Priority Data

Mar. 27, 1987 [FR] France ................ 87 04268

[51] Int. Cl.$^4$ ............................. G01B 9/02
[52] U.S. Cl. ............................. 356/350
[58] Field of Search ..................... 356/350

[56] References Cited
U.S. PATENT DOCUMENTS 4,759,629 7/1988 Everest et al. ............. 356/350

FOREIGN PATENT DOCUMENTS 2555739 5/1985 France.
2134248 8/1984 United Kingdom.

Primary Examiner—Vincent P. McGraw
Assistant Examiner—S. A. Turner
Attorney, Agent, or Firm—Oblon, Spivak, McClelland, Maier & Neustadt

[57] ABSTRACT

A method and corresponding device, are provided for detecting the propagation time variations in the ring of an interferometer and includes phase modulation of the contrarotating waves travelling through the ring by means of assymetric square waves at a period twice the initial propagation time, which create level zero phase shift stretches in the modulation of the difference between the two waves emerging from the ring. These level stretches result in pulses in the detected output signal whose width is variable with the propagation time. The invention applies particularly to the control of the wave length of the source of the interferometer, particularly with respect to temperature variations of the source.

7 Claims, 4 Drawing Sheets

FIG_1 PRIOR ART
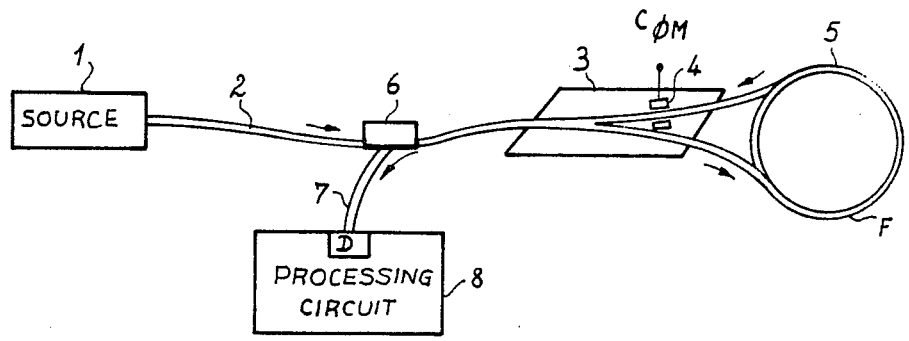
FIG_2 PRIOR ART
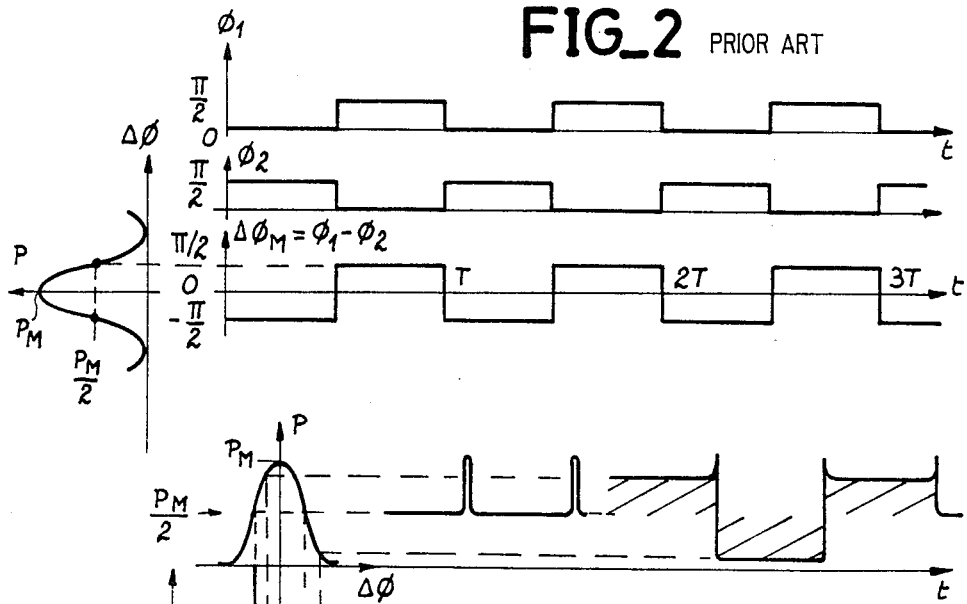
FIG_3 PRIOR ART
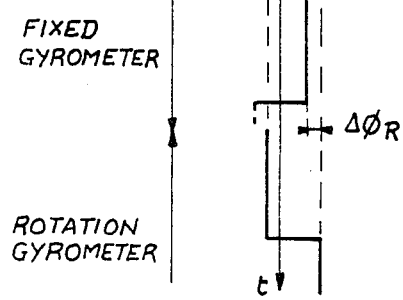

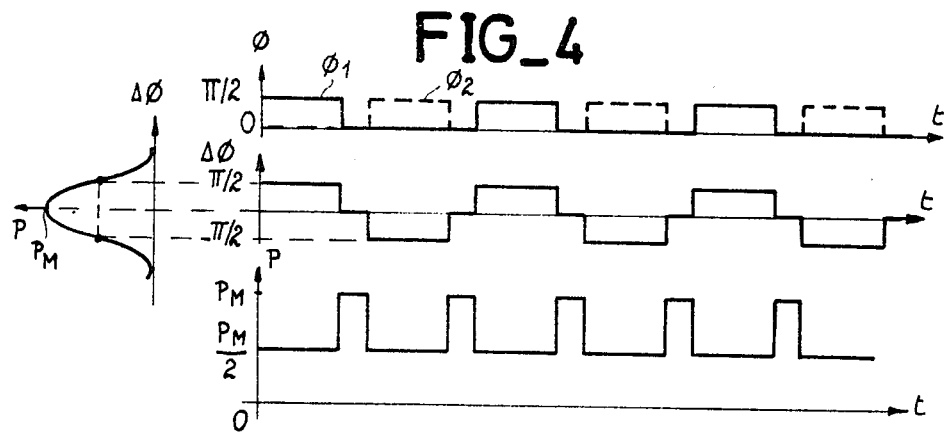
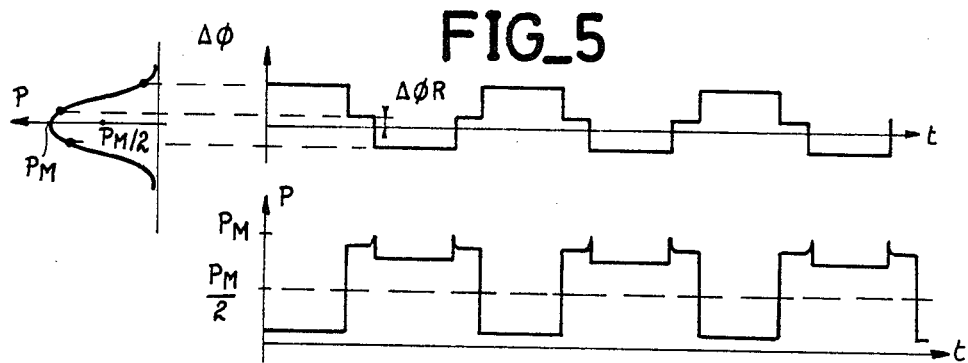
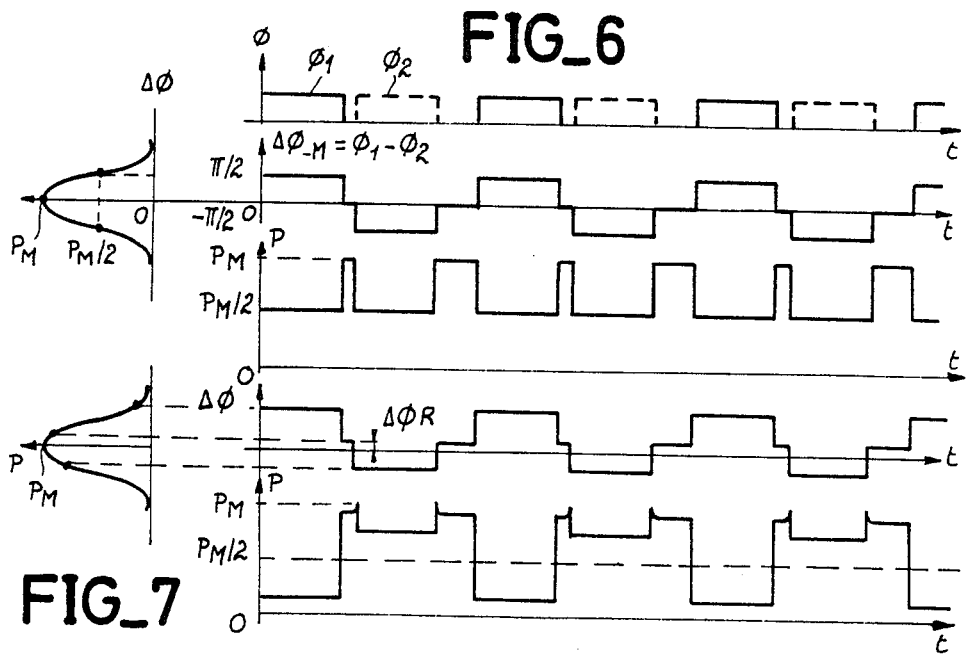

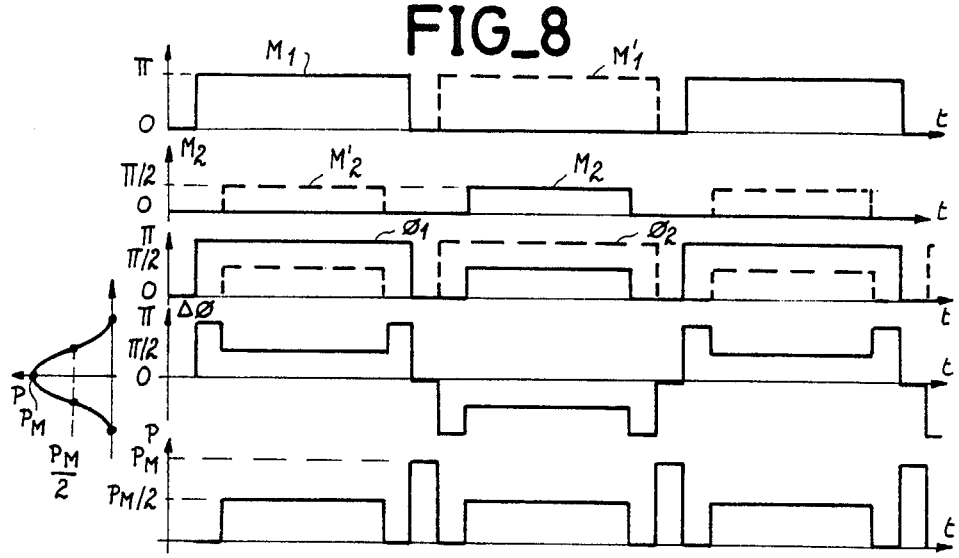
FIG_8
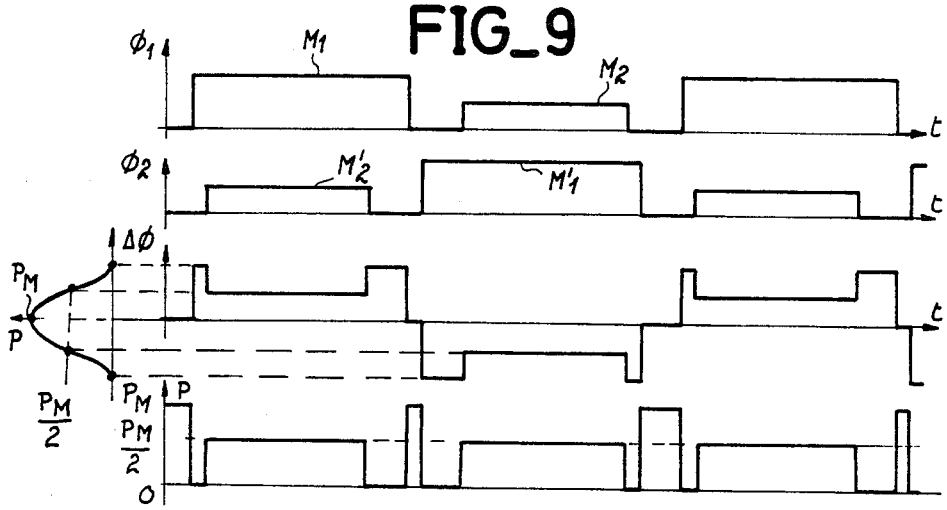
FIG_9
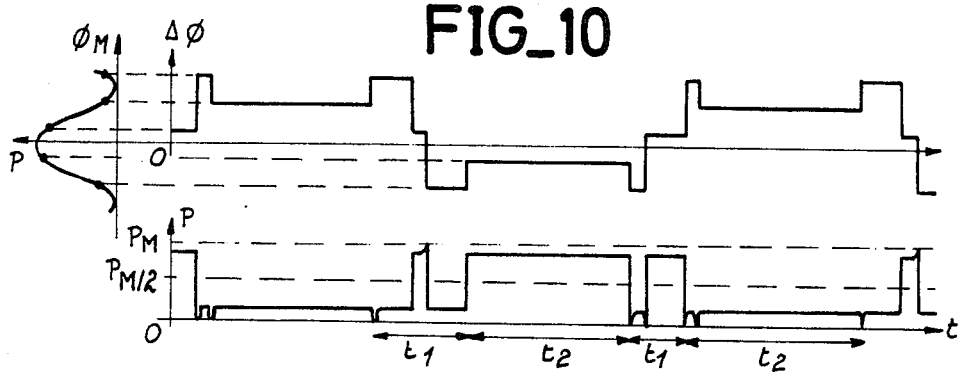
FIG_10

FIG_11
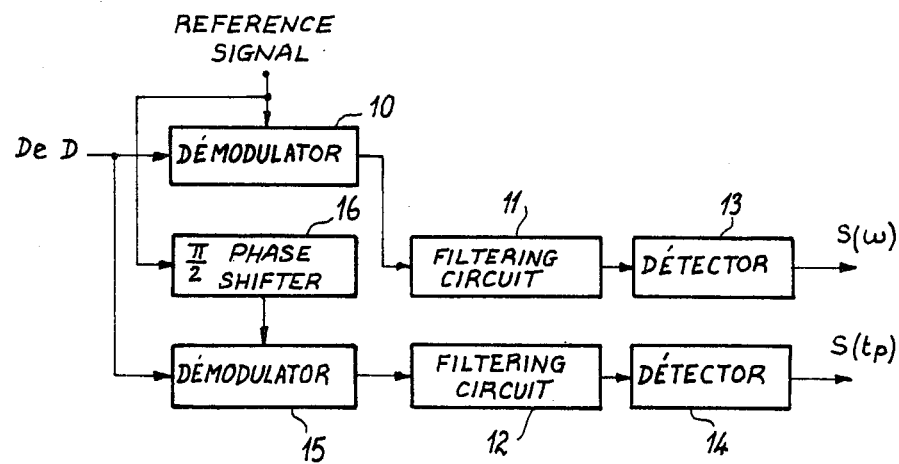
FIG_12
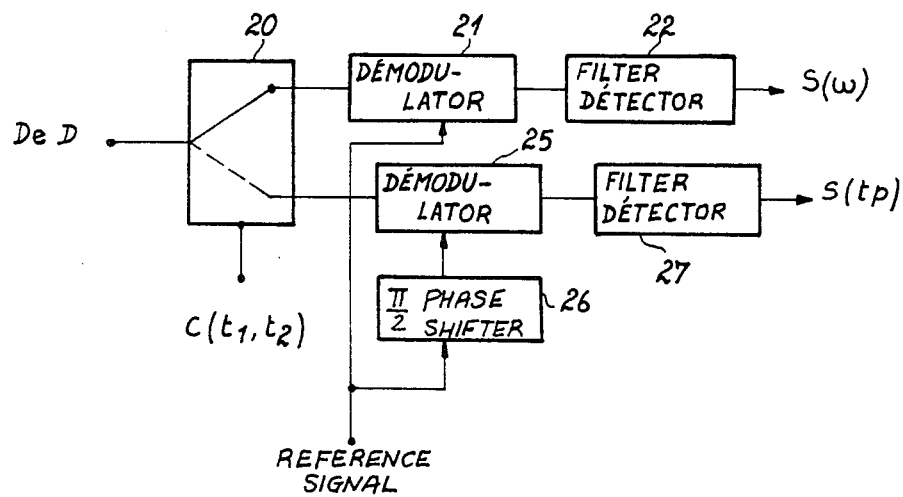

METHOD AND DEVICE FOR DETECTING PROPAGATION TIME VARIATIONS IN A RING INTERFEROMETER AND APPLICATION THEREOF TO WAVE LENGTH CONTROL

BACKGROUND OF THE INVENTION

1. Field of the invention

The invention relates to ring interferometers and more particularly to a method for detecting propagation time variations in such an interferometer, to the device for implementing this method and its application thereof to controlling the mean wave length of the source.

2. Description of the Prior Art

In a ring interferometer, two contrarotating waves are propagated in a ring wave guide, for example an optical fiber coil; after propagation the two waves are in perfect phase at the ends of the coil in the absence of non reciprocal effects, particularly in the absence of SAGNAC effect due to rotation of the interferometer.

On the other hand, when the interferometer is rotated with respect to a Galilean reference, the phase-shift between the two waves emerging from both ends of the coil is given by $$\Delta \phi = \frac{4nLR}{\lambda c} \omega$$

where L is the length of the coil, R its radius, $\lambda$ the wave length, c the speed of light in a vacuum and $\omega$ the speed of rotation.

In the absence of other non reciprocal effects, i.e. in the absence of magnetic field and so of Farraday effect, and in the absence of displacement of material and so of the FIZEAU effect, measurement of the phase-shift leads to measurement of the speed of rotation, provided that all the other parameters are stable, particularly the wave length of the source.

Now this wave length varies, in particular as a function of the temperature. For a source formed by a super luminescent diode, or "DSL", on gallium arsenide, variation of the wave length of the source is of the order of $4 \times 10^{-4}$ per degree Celsius. This variation leads to a corresponding variation of the propagation time of light in the wave-guide because of the dispersion.

Taking into account the precision now obtained in the measurement of speed using an optical fiber ring interferometer with a DSL as source and a monomode optical fiber with polarization conservation, these wave length variations affect the accuracy of the measurement. Consequently, it is necessary to evaluate them, either for correcting them or for taking them into account in the measurement of the phase-shift.

SUMMARY OF THE INVENTION

The invention provides a method of detecting propagation time variations in a ring interferometer, the device intended for its implementation and application thereof to controlling the means wave length of the source.

The advantage of the method of the invention is that it makes it possible to dissociate the effect to be measured, SAGNAC effect related to the speed of rotation, from the effect of wave length variation, as will be explained hereafter.

In accordance with the invention, a method for detecting propagation time variations in a ring interferometer consists in phase modulation of the wave in the form of square waves at one end of the interferometer, the period of the modulation being twice the mean propagation time in the fiber, and in extracting from the detected signal at the output of the interferometer pulses at a frequency twice the modulation frequency whose duration is variable with variation of the propagation time.

The invention also provides a device for detecting variations in the propagation time in a ring interferometer, comprising a phase modulator placed at one end of the interferometer controlled by a control signal of a period twice that of the initial propagation time and formed of assymetric square waves, the output signal from the detector of the interferometer being processed in a processing circuit which extracts a signal therefrom at the modulation frequency characteristics of a non reciprocal phase-shift to be measured, and a signal characteristic of the propagation time variations.

The invention finally relates to the application of this method, and of the corresponding device, to the control of the mean wave-length of the source used in the interferometer.

BRIEF DESCRIPTION OF THE DRAWINGS

The invention will be better understood and other characteristics will be clear from the following descrption with reference to the accompanying FIGS.

FIG. 1 shows an optical fiber ring interferometer;

FIGS. 2 and 3 are diagrams illustrating a method used at the present time for measuring the phase-shift due to the rotation of a ring interferometer used as a gyrometer.;

FIGS. 4, 5, 6 and 7 are signal diagrams illustrating the detection method of the invention, and particularly the modulation signal and the signals detected respectively without rotation and without propagation time variation, with rotation and without propagation time variation, without rotation and with propagation time variation and finally with rotation and propagation time variation;

FIG. 8 shows signal diagrams illustrating a variant of the detection method of the invention, when there is neither rotation nor propagation time variation;

FIG. 9 illustrates the same variant when a propagation time variation occurs, in the absence of rotation;

FIG. 10 illustrates the same variant when there is both propagation time variation and phase-shift due to rotation; and FIGS. 11 and 12 are detailed diagrams of the processing circuit of FIG. 1, respectively for the two variants of the detection method described.

DESCRIPTION OF THE PREFERRED EMBODIMENTS

FIG. 1 shows schematically an optical fiber ring interferometer. It comprises a low coherence light source 1, for example a superluminescent ASGA diode or "DSL", whose spectrum extends over $49\mu$, that is to say $\pm 5\%$ about the mean wave length; this source 1 is coupled to one end of a monomode optical fiber 2 with polarization conservation, whose other end is coupled to the input of a Y separator on lithium niobate 3. Electrodes are provided on each side of one of the output branches of the separator, so as to form a phase modulator 4, a voltage or phase modulation control $C_{\phi M}$ being applied between these electrodes. The two ends of a monomode optical fiber coil 5 with polarization conservation are coupled to the ends of the two branches of separator 3. As is known, coupling of the optical fiber ends to the wave-guides of separator 3 is preferably provided along faces slanting with respect to the longitudinal axis of the guides so as to avoid parasite reflections.

A light diverting component 6, connectd to an output guide 7, transmits to a detector D the wave after separation, circulation in the fiber coil and recombination. A processing circuit processes the detector signal so as to extract the useful signal therefrom, giving for example a measurement of the speed of rotation $\omega$ when this ring interferometer is used as a gyrometer.

In such an optical fiber ring interferometer used as a gyrometer, it is known to improve the sensitivity and so the measurement of the phase-shift between the two contrarotating waves by introducing a phase modulation at one of the two ends of the ring. This modulation affects one wave before it travels through the fiber coil whereas the other is affected by it with a delay equal to the propagation time in the coil. The modulation usually chosen is a symmetrical square wave modulation, alternately $+\pi/2$ and 0, whose half period T/2 is preferably equal to the initial propagation time tp=to in the fiber, namely.

$$\frac{T}{2} = \text{to} = \frac{nL}{c}$$

The phase-shift between the two waves, recombined after circulation in the fiber, then undergoes a modulation equal to the difference between the modulation signal and the same signal shifted by the propagation time. In the detected signal, the phase deviation about zero leads to a variation of the signal about the maximum of the $COS^2$ curve of the phase-shift $\Delta\phi$. In the absence of a phase-shift due to non reciprocal effects, particularly due to rotation, this phase deviation is symmetrical; when an additional phase-shift $\Delta\phi_R$ due to the rotation is added thereto, the signal changes trend and has a component at the period of the modulation whose amplitude varies with the additional phase-shift.

FIG. 2 illustrates the modulation used in this known measurement method. The first curve represents the phase-shift $\phi_1$ applied to the wave entering through the end of the fiber having the phase modulator 4; the second curve illustrates the phase-shift $\phi_2$ applied to the wave travelling in the other direction, offset exactly by the propagation time to with respect to $\phi_1$; the third curve represents the modulation $\Delta\phi_M$ of the phase difference between the two waves, in the absence of rotation; the $COS^2$ curve which represents the output power as a function of the phase-shift $\Delta\phi$ between the two waves: $P=P_M \cdot Cos^2 \Delta\phi/2$ has also been represented;: $P_M$ is the maximum output power obtained for $\Delta\phi=0$ and for the phase-shift ranges $-n/2$ and $-n/2$, the output signal has an amplitude $P_M/2$.

The curve showing the phase-shift variation resulting from the modulation $\Delta\phi$m and from a phase-shift due to the rotation $\Delta\phi_R$ as a function of time, and the corresponding detected signal P as a function of time are shown in FIG. 3 where $P_M \cdot Cos^2 \Delta\phi/2$ has also been shown. This diagram shows that as long as the phase-shift $\Delta\phi_R$ is zero, the detected signal is constant; it only includes pulses at the time of phase changes from $+n/2$ to $-n/2$ and conversely. As soon as the gyrometer rotates, a periodic component at the modulation frequency is superimposed on the continuous component. Its amplitude is related directly to the phase-shift $\Delta\phi_R$ due to the rotation.

In accordance with the invention, instead of applying a symmetrical square wave modulation to both waves as in the prior art recalled above, the modulator is controlled so as to apply thereto an assymetrical square wave modulation, but still with a half period equal to the initial propagation time, i.e. at the frequency called "natural" frequency of the interferometer $f_p = \frac{1}{2}$ to. It will be shown below that such a modulation makes it possible to detect possible propagation time variations and so variations in the mean wave length of the source, likely to occur particularly as a function of the temperature.

FIG. 4 is a diagram of the different modulation signals and of the detected signal for a simple asymmetric square wave modulation, of period T=to twice the initial propagation time in fiber $t_o$ in the absence of rotation and in the absence of propagation time variation: $\phi_1$ and $\phi_2$ have been shown on the same curve respectively with the continuous line and with a broken line. The phase difference $\Delta\phi$ of the two contrarotating waves equal to $\Delta\phi_M = \phi_M = \phi_1 - \phi_2$ has thus sections at 0 instead of passing directly from phase $\pi$ to phase $-\pi$. Consequently, in the absence of phase-shift $\Delta\phi_R$, the detected signal has a continuous component at level $P_M/2$ and pulses from $P_M/2$ to $P_M$ of a duration equal to the duration of the level sections, that is to say depending on the cyclic ratio of the signal applied to the modulator, at twice the frequency of the modulation frequency.

When an additional phase-shift due to the rotation $\Delta\phi_R$ occurs, FIG. 5 shows that the phase-shift $\Delta\phi$ is offset by $\Delta\phi_R$ and generates in the detected signal a period component at the modulation frequency, whose amplitude depends on the phase shift. Therefore the measurement may be made as before.

If, in addition, the wave length of the source varies, the propagation time in the ring varies because of the dispersion. Consequently, the period of the modulation signal which has not varied, is no longer equal to twice the propagation time. That means that the phase-shifts $\phi_1$ and $\phi_2$ of the two contrarotating waves are no longer exactly offset in time by a half period and that the level stretches at 0 of the phase difference $\Delta\phi_M = \phi_1 - \phi_2$ are no longer of the same duration.

FIG. 6 shows this case. $\phi_1$ and $\phi_2$ have been shown as a function of time on the same diagram, $\phi_1$ being shown with a continuous line and $\phi_2$ with broken lines. The difference $\Delta\phi_M = \phi_1 - \phi_2$ is represented by the second curve. The duration of the level sections at 0 is not constant. Consequently, the corresponding detected signal P, for $\Delta\phi_R = 0$, is formed of pulses at a frequency twice the modulation frequency, but of different durations, which generates a signal at the modulation frequency but in quadrature with the rotation signal.

In the presence of a phase-shift $\Delta\phi_R$ due to rotation, FIG. 7 shows that the phase modulation $\Delta\phi$ is offset by $\Delta\phi_R$ and that the corresponding signal includes, in addition to pulses at the same frequency (twice the modulation frequency), of a lower amplitude than those shown in FIG. 6 but of unequal durations as in FIG. 6, a periodic component at the modulation frequency, whose amplitude depends on the phase-shift $\Delta\phi_R$ due to rotation. These two combined signals can be processed separately, one being characteristic of the variation in the propagation time in the fiber and the other of the non reciprocal phase-shift $\Delta\phi_R$. The means used for such processing are shown in FIG. 11. The signal from detector D is applied to two demodulators, in phase and quadrature, 10 and 15 which also receive a reference signal at the modulation frequency respectively in phase and in quadrature via $\pi/2$ phase-shifter 16 The outputs of the demodulators are connected to the inputs of two filtering circuits, 11 and 12, filtering out respectively the component at the in phase modulation frequency (rotation signal) and the component at the in quadrature modulation frequency (propagation time signal). The outputs of these two filtering circuits are connected respectively to detectors 13 and 14 whose output signals S ($\omega$) and S(tp) are respectively characteristic of the speed to be measured $\omega$ and of the propagation time tp.

As has already been described, and as shown in the second curve of FIG. 7 representing the detected signal as a function of time, when a phase-shift due to variation of the wave length occurs, the component of the signal intended for measuring the rotation and the component of the signal characteristic of this wave length variation are combined.

FIG. 8 illustrates a particular modulation obtained from asymmetric square waves which makes it possible, by simple chopping of the detected signal as a function of time, to separate a useful signal for measuring the rotation and a useful signal for measuring the wave length variation, and which additionally makes it possible to increase the dynamics of the signal characteristic of the propagation time variation.

The phase-shift $\phi_1$ applied to the detected wave before circulation in the fiber is a periodic signal, resulting from the addition of two detected signals, of period T=2to, $M_1$ and $M_2$ shown with continuous lines, both in the form of asymmetric square waves respectively between 0 and $\pi$ and between 0 and $\pi/2$ the second having an amplitude half that of the first one, and such that its level sections at the high level are centered with respect to the level sections at 0 of the first one. The duration of the square waves at the high level of signal $M_2$ is less than that of the high level square waves of the first signal $M_1$. Thus, the contrarotating wave modulated after circulation in the fiber, i.e. with a delay equal to the propagation time, is subjected to a modulation by $\phi_2$ equal to the sum of signals $M'_1$ and $M'_2$ shown with broken lines in the same diagrams as $M_1$ and $M_2$. The signal resulting from the interferences between the two waves which are propagated in the fiber is therefore phase modulated by $$\Delta\phi = \phi_1 - \phi_2$$
$$= (M_1 - M'_1) - (M_2 - M'_2).$$

As mentioned above, the amplitudes of the modulation signals are chosen so as to cause alternatively a phase deviation from 0 to $\pi$ coming back to $\pi/2$ then a phase deviation from $\pi/2$ to $\pi$ coming back to 0, and symmetrically. The resultant detected signal, without other phase-shift than the modulation, comprises alternately pulses from 0 to $P_M$ then square waves from 0 to $P_M/2$ as shown in FIG. 8.

In the presence of a variation in the mean wave length of a source, the propagation time is no longer equal to the half period of the modulation signal, and the modulation applied to the two contrarotating waves, by $\phi_1$ and $\phi_2$, creates a resultant modulation $\Delta\phi$ on the output signal which is no longer symmetrical, as shown in FIG. 9. As in the first variant shown in FIG. 6, the pulses created on each side of the square waves no longer have the same duration, and the corresponding output signal comprises pulses from 0 to $P_M$ which have different durations, the difference depending on the propagation time variation with respect to to. If no rotation is applied to the gyrometer, there is no other difference, and as shown in FIG. 9, the level portions coresponding to the phase-shifts $+\pi/2$ and $-\pi/2$ give an output signal of power $P_M/2$.

If a phase-shift $\Delta\phi_R$ due to a rotation to be measured is superimposed on this phase-shift modulation, an alternating component about $P_M/2$ due to this phase shift is created in the output signal, at the same time as the amplitude of the pulses varies slightly as shown in FIG. 10. But the duration of these pulses, different on each side of a square wave, are not affected by this additional phase-shift and remain characteristic of the propagation time variation in the fiber. Consequently, as mentioned above, chopping of the output signal as a function of time makes it possible to detect the two effects separately: the signal present during the intervals $t_1$ gives a value of the propagation time tp in the optical fiber and the signal present during the interval $t_2$ gives the value of the speed of rotation.

FIG. 12 shows the corresponding processing circuit: the signal from detector D is applied to one or other of two channels A and B under the control of a switch 20 by means of a control signal C ($t_1$, $t_2$). The first channel A comprises a demodulator 21 whose input is connected to the first output of switch 20, and whose other input receives the reference signal. Filtering a detection circuit 22 makes it possible to isolate a signal chracteristic of the rotation $\omega$, S($\omega$). Similarly, the second channel B comprises a demodulator 25 one input of which is connected to the second output of switch 20 and whose other input receives the reference signal after a phase-shift of $\pi/2$ in a phase-shifter 26. After processing, i.e. filtering and detection in a circuit 27, the signal S(tp) from this second channel is characteristic of the propagation time, S(tp).

This method of detection makes it possible to measure propagation time variations $\Delta tp/to$ of the order of $7\times 10^{-8}$.

The effect of the temperature variation on the fiber coil leads to a relative propagation time variation of the order of $10^{-5°}$ per degree Celsius. In addition, the temperature variation also leads to a variation of the mean wave length of the source which creates a variation in the propagation time by dispersion. It is therefore possible to measure the mean wave length of the source from the measurement of the variation of the propagation time as mentioned above, taking into account the effects due to the fiber itself, as a function of the temperature variation.

For a silica fiber, with a mean wave length of $0.85\mu$, a wave length variation $\Delta\lambda/\lambda = 5.10^{-6}$ produces a relative propagation time variation of $\Delta tp/tp = 10^{-7}$. If the temperature of the coil is known precisely, measurement of the propagation time variation gives the measurement of the mean wave length of the source (in the middle of its pass band).

In another way of looking at it, if two complementary reference filters are used, for example, the same interferential filter working by transmission and reflection, of a width less than the band width of the source, and if the wave length of the source is controlled so as to maintain in the interferometer a constant mean propagation time for the transmitted wave and for the reflected wave, the spectrum of the source is then controlled so as to remain centered on the filter which then becomes the new wave length reference. This method uses then an external reference (the filter) but comparison with the source, which will still require a more or less complex processing of the signal, uses the same modulation means as the interferometer.

The invention is not limited to the variants described above. In particular, other types of asymmetric modulation signals may be used for detecting the propagation time variations, particularly a modulation signal formed of $\pi$ modulated square waves of a duration less than those of the $\pi/2$ modulated square waves in the second variant described. These different examples are not limitative.

What is claimed is:

1. A method of detecting propagation time variations in a ring interferometer, comprising the steps of:
   providing a source of coherent light;
   coupling said source to an optical fiber arranged in a ring;
   modulating the light at one end of the ring using an asymmetric square wave modulation with the period of modulation being twice the mean propagation time in the fiber;
   detecting an output light signal;
   extracting from the detected signal pulses at a frequency twice the modulation frequency;
   separating the extracted pulses into a first signal indicative of a non-reciprocal phase shift and a second signal whose duration varies as the propagation time.

2. The method as claimed in claim 1, wherein the phase modulation signal is formed of a series of square waves creating a phase-shift of $\pi/2$ of a duration substantially different from the mean propagation time, followed by level zero phase shift stretch over the rest of the period of the modulation signal.

3. The method as claimed in claim 1, wherein the phase modulation difference signal is formed of a succession of square waves creating a phase-shift of $\pm\pi$, each of a duration less than the mean propagation time, these square waves being separated by level stretches where the phase-shift is zero.

4. The method as claimed in claim 1, wherein the modulation signal is formed of a succession of square waves creating on each modulation period a phase-shift of $\pi$ then a phase-shift of $\pi/2$ separated by level zero phase-shift stretches, the durations of the $\pi$ and $\pi/2$ phase-shifts being different.

5. The method according to claim 1, further comprising the step of controlling the wavelength of the light source in response to said second signal.

6. A device for detecting propagation time variations in a ring interferometer, comprising:
   a coherent light source;
   a ring interferometer connected to said light source;
   an asymmetrical square wave modulator arranged at one end of the interferometer, the period of the modulation being twice the mean propagation time in the fiber;
   a detector for detecting the output of the interferometer;
   a processing circuit connected to said detector for extracting a signal at a frequency twice the modulation frequency and for producing a first signal indicative of a non-reciprocal phase shift and a second signal indicative of propagation time variations.

7. The device according to claim 6, further comprising a control means responsive to said second signal for controlling the wavelength of said light source.

* * * * *